US006436528B1

United States Patent
Külper et al.

(10) Patent No.: US 6,436,528 B1
(45) Date of Patent: Aug. 20, 2002

(54) ADHESIVE TAPE BASED ON A BINDER-CONSOLIDATED WEB

(75) Inventors: Klaus Külper, Pinneberg; Frank Ganschow, Elmshorn, both of (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/410,354

(22) Filed: Sep. 30, 1999

(30) Foreign Application Priority Data

Oct. 24, 1998 (DE) .......................... 198 49 052
May 8, 1999 (DE) .......................... 199 21 408
Aug. 7, 1999 (DE) .......................... 199 37 446

(51) Int. Cl.$^7$ .............. B32B 7/12; C09J 7/02
(52) U.S. Cl. ............ 428/343; 428/40.1; 428/198; 428/355 AC; 428/356; 442/149; 442/151; 442/374; 442/375
(58) Field of Search ............. 428/40.1, 198, 428/343, 355 AC, 356; 442/374, 375, 149, 151

(56) References Cited

U.S. PATENT DOCUMENTS

| | | | | |
|---|---|---|---|---|
| 5,496,603 A | * | 3/1996 | Riedel et al. ............. | 428/40 |
| 5,629,078 A | | 5/1997 | Ganschow | |
| 5,631,073 A | | 5/1997 | Riedel et al. ............. | 442/364 |
| 6,107,219 A | * | 8/2000 | Joseph et al. ............. | 442/361 |

FOREIGN PATENT DOCUMENTS

| | | | | |
|---|---|---|---|---|
| DE | 94 01 037.4 | 4/1994 | | |
| DE | 94/00574 U1 | 5/1994 | ............. | C09J/7/02 |
| DE | 44 42 092 A1 | 5/1996 | | |
| DE | 44 42 093 A1 | 5/1996 | | |
| DE | 44 42 507 A1 | 6/1996 | | |
| DE | 195 23 494 C2 | 1/1997 | ............. | C09J/7/04 |
| DE | 195 23 494 C2 | 4/1998 | | |
| DE | 298 04 431 U1 | 9/1998 | ............. | C09J/7/04 |
| DE | 298 19 014 U1 | 4/1999 | ............. | C09J/7/04 |
| EP | 0 452 594 A1 | 12/1990 | ............. | C09J/7/04 |
| EP | 0 829 222 A1 | 3/1998 | ............. | A47L/25/00 |
| WO | WO 99/24518 | 3/1998 | | |
| WO | 99/24518 A1 | 5/1999 | ............. | C09J/7/04 |

OTHER PUBLICATIONS

Ref. 92–044585/06 zu JP 03287–580–A; dated Dec. 18, 1991.
Ref. 86–315312/48 zu JP 61233–076–A; dated Oct. 17, 1986.
30907X/17 zu JP 51028–834; dated Mar. 11, 1976.
Lünenschloss, Joachim, et al.: "Vliesstoffe", Georg Thieme Verlag, Stuttgart, New York 1982, S. 54–66 Bindemittel, S. 43–45 Bindefasern, S. 106–119 Spinnvliesstoffe, S. 122, 123, Verfestigung, S. 168–170, 177–179, 199, 200, 215–217, 21–225, 270.

* cited by examiner

*Primary Examiner*—Daniel Zirker
*Assistant Examiner*—Victor S Chang
(74) *Attorney, Agent, or Firm*—Norris McLaughlin & Marcus

(57) ABSTRACT

Adhesive tape having a tapelike backing of nonwoven material, which is coated on at least one side with an adhesive, the web being a staple fibre web which is mechanically consolidated or wet-laid, the staple fibre web being consolidated further by the addition of binders.

11 Claims, 1 Drawing Sheet

ADHESIVE TAPE BASED ON A BINDER-CONSOLIDATED WEB

Figure 1:
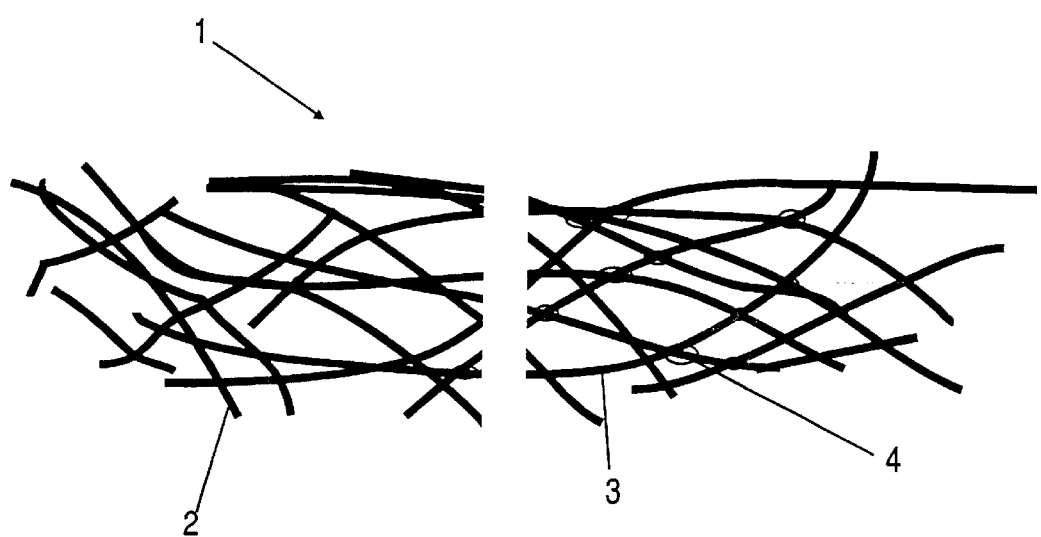

The invention relates to an adhesive tape having a tapelike backing comprising a nonwoven material which is wet-laid or mechanically preconsolidated and additionally consolidated adhesively using a chemical binder, and is coated on at least one side with an adhesive, and to its use.

Adhesive tapes having a tapelike backing based on wovens or stitchbonded webs are known, woven tapes having been obtainable for a relatively long time and tapes having a stitchbonded web backing being described, for example, in DE 94 01 037 U1. Pressure-sensitive adhesive coatings are preferably employed as the adhesive coating.

DE 44 42 092 C1 describes such an adhesive tape, based on stitchbonded webs, which is coated on the reverse of the backing. DE 44 42 093 C1 is also based on the use of a web as backing for an adhesive tape; in this case, a cross-laid fibre web is described which is reinforced by the formation of loops from the fibres of the web; i.e. a web known to the person skilled in the art as Malifleece. DE 44 42 507 C1 likewise discloses an adhesive tape for cable bandaging, but bases it on so-called Kunit or Multiknit webs.

DE 195 23 494 C2 discloses the use of an adhesive tape having a backing comprising nonwoven material for bandaging cable harnesses, the said tape being coated on one side with an adhesive. The web employed in accordance with the invention is a spunbonded web of polypropylene, which is thermally consolidated and embossed with the aid of a calender, the embossing roll having an embossing surface of from 10% to 30%, preferably 19%.

DE 298 04 431 U1 likewise discloses the use of an adhesive tape having a backing comprising nonwoven material for the bandaging of cable harnesses, the proposed spunbonded web consisting of polyester.

DE 298 19 014 U1 discloses adhesive tapes based on a web which is consolidated with air and/or water jets. The disadvantage of these backings, despite the mechanical consolidation, is that it is impossible by this technique to rule out the extraction of individual long threads and an adverse effect on the adhesive properties. In the case of very extensive consolidation of the individual fibres, other advantageous backing properties, especially for the harnessing of cables in cars, can no longer be obtained.

WO 99/24518 A1 describes an adhesive tape where the backing material is a nonwoven whose suitability for adhesive tape applications derives from the specific selection of fibres or filaments having a fineness of more than 15 denier and from a sheet layer applied additionally by extrusion. The additional extrusion coating required is not the only disadvantage for use; in particular, the restriction to very thick fibre material results in a coarse web which lacks the typically soft, textile character. Denier is a unit which is common in the textile industry, and originates from France, for the linear density (fineness) of yarns. The unit is produced by the equation:

$$\text{linear density} = \frac{\text{filament mass}}{\text{filament lenght}}$$

Adhesive tapes having a woven backing satisfy stringent technical requirements but are laborious to produce, owing to the poor productivity of the weaving process, are expensive, and have a tendency for the adhesive composition to strike through. Adhesive tapes having stitchbonded web backings, although simple in their construction, nevertheless show considerable disadvantages in practical use, such as problems owing to the heterogeneous web structure with reinforcing parallel stitches. Furthermore, the production rate of this technology is limited even with modem high-performance units.

Furthermore, with a single-sided adhesive tape having a conventional Malifleece as backing material, i.e. a Malifleece which has not been additionally bonded, it is necessary to treat the reverse in order to prevent delamination of the backing and/or extraction of individual fibres or tufts of fibres from the surface, especially in the case of unwinding from the roll. Alternatively, this objective can be attained by introducing a release paper between the individual plies of adhesive tape during the operation of winding the adhesive tape roll, although this is undesirable for the producer owing to the additional cost factor and to the user owing to waste disposal and handling problems, quite apart from the fact that siliconized release papers are as far as possible avoided, especially in coating sectors.

In the case of stitchbonded or otherwise mechanically consolidated webs (needlefelts or air- and/or water-jet consolidated webs) as well, the individual fibres of the web are nevertheless still displaceable with respect to one another and can be torn out individually under stress. This applies both to fibres in the sheetlike backing and, quite particularly, to fibres at the surfaces. It is extremely laborious, and hardly economically feasible, to conduct such consolidation, possibly by passing the web several times through the consolidation process, to such an extent that the fibre assembly no longer suffers delamination—in this case there would, however, inevitably be a loss of desired properties such as tearability by hand, textile character, damping properties, etc.

If, therefore, at this point, in the manufacturing process of the backing and/or of the adhesive tape, there is a failure to ensure additional improvements, then the fibres extracted during the unwinding of the adhesive tape roll have a marked adverse effect on the adhesive properties of the adhesive tape. They are responsible for poor visual qualities and may even ruin the entire functional capacity of the adhesive tape.

The object on which the present invention is based is therefore to improve an adhesive tape in such a way that the disadvantages of the prior art do not occur to the same extent, if at all.

This object is achieved by means an adhesive tape as specified in the main claim. The subclaims relate to advantageous developments of the adhesive tape and to a particularly advantageous use thereof.

The invention accordingly provides an adhesive tape having a tapelike backing of nonwoven material which is coated on at least one side with an adhesive, the untreated web being a fibre web which in a first step is mechanically consolidated, for example, by the formation of loops from fibres of the web or by needling, stitching or air- or water-jet treatment, or else is a wet-laid web which has been laid hydrodynamically. This intermediate then undergoes additional, adhesive consolidation by means of an added binder.

Preconsolidated webs are produced, for example, on stitchbonding machines of the the "Malifleece" type from the company Karl Mayer, formerly Malimo, and can be obtained, inter alia, from the companies Naue Fasertechnik and Techtex GmbH. A Malifleece is characterized in that a cross-laid web is consolidated by the formation of loops from fibres of the web.

The backing used can also be a web of the Kunit or Multiknit type. A Kunit web is characterized in that it originates from the processing of a longitudinally oriented fibre web to form a sheetlike structure which has the heads and legs of loops on one side and, on the other, loop feet or pile fibre folds, but possesses neither filaments nor prefabricated sheetlike structures. A web of this kind has also been produced for many years, for example, on stitch-bonding machines of the "Kunitvlies" type from the company Karl Mayer. A further characterizing feature of this web is that, as a longitudinal-fibre web, it is able to absorb high tensile forces in the lengthwise direction. The characteristic feature of a Multiknit web relative to the Kunit is that the web is consolidated on both the top and bottom sides by virtue of the double-sided needle punching.

Finally, stitchbonded webs are also suitable as an intermediate for forming an adhesive tape of the invention. A stitchbonded web is formed from a nonwoven material having a large number of stitches extending parallel to one another. These stitches are brought about by the incorporation, by stitching or knitting, of continuous textile filaments. For this type of web, stitch-bonding machines of the type "Maliwatt" from the company Karl Mayer, formerly Malimo, are known.

Starting materials envisaged for the textile backing are, in particular, polyester fibres, polypropylene fibres, viscose fibres or cotton fibres. The present invention, however, is not restricted to the aforementioned materials. Rather, a large number of further fibres can be used to produce the web which are evident to the person skilled in the art without the need for an inventive step.

The basic fibres of the web consist preferably of virgin or reclaimed polyester fibres. These fibres should be between 10 and 100 mm long and should have a linear density of from 1.5 to 10 dtex.

Whereas other sheetlike textile structures acquire their composite strength as a result of interweaving or interlooping of yarns or threads, the fibre-fibre adhesion of industrial nonwovens made from short fibres is too weak for them to be used as backing materials for industrial adhesive tapes, for which minimum strengths must be ensured in both the machine direction and the Z direction (vertically to the web surface) in order to make certain that the web can be processed both in the course of adhesive tape manufacture and during the end use. For normal adhesive tape applications, unconsolidated webs can be used—if at all— only subject to very great restrictions.

Known consolidation methods for webs include mechanical, thermal and chemical consolidation. For a number of years, mechanical consolidation methods have been used in order to produce backing materials for adhesive tapes. Known in particular in this respect is a stitchbonded web formed from a large number of parallel stitches; the stitch-bonding technique is known, with the necessary consolidation, to be a slow process of minimal productivity, and the stitching thread required can entail additional problems.

Whereas with mechanical consolidation the fibres can be held together purely mechanically by entanglement of the individual fibres, by the interlooping of fibre bundles or by the stitching-in of additional yarns, adhesives (with binder) or cohesive (binderless) fibre-fibre bonds can be obtained by both thermal and chemical techniques. Given appropriate formulation and an appropriate process regime, these bonds can be restricted exclusively, or at least predominantly, to the fibre nodal points, so that a stable, three-dimensional network is formed while retaining the loose, open structure in the web.

For the use, in accordance with the invention, of nonwovens for backing material for adhesive tapes, the adhesive consolidation of mechanically preconsolidated or wet-laid webs is of particular interest, it being possible for the said consolidation to take place by way of the addition of binder in solid, liquid, foamed or pastelike form. A great diversity of fundamental embodiments is possible: for example, solid binders as powders for trickling in, as a sheet or as a mesh, or in the form of binding fibres. Liquid binders can be applied as solutions in water or organic solvents or as a dispersion. For adhesive consolidation, binder dispersions are chosen predominantly: thermosets in the form of phenolic or melamine resin dispersions, elastomers as dispersions of natural or synthetic rubbers, or, usually, dispersions of thermoplastics such as acrylates, vinyl acetates, polyurethanes, styrene-butadiene systems, PVC and the like, and also copolymers thereof. Normally, the dispersions are anionic or nonionically stabilized, although in certain cases cationic dispersions may also be of advantage.

The binder can be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik" (Arbeitgeberkreis Gesamttextil, Eschborn, 1996).

For mechanically preconsolidated webs which already possess sufficient composite strength, the single-sided spray application of a binder is appropriate for reducing the problem of individual fibre tear-out from the surface in the case of use for adhesive tapes—the adhesive action of the binder comes to the fore only at the points where this improvement in property is required, namely on the upper face of the backing. Such a procedure not only is sparing in its use of binder but also greatly reduces the drying energy requirement. Since no squeeze rolls are required and the dispersions remain predominantly in the upper region of the nonwoven material, unwanted hardening and stiffening of the web can be very largely avoided.

For sufficient adhesive consolidation of the nonwoven backing, the addition of binder in the order of magnitude of from 3% to 50%, in particular from 5% to 20%, based on the weight of the fibre web, is generally required.

The binder can be added as early as during the manufacture of the nonwoven, in the course of mechanical preconsolidation, or else in a separate process step, which can be carried out in-line or off-line. Following the addition of the binder it is necessary temporarily to generate a condition in which the binder becomes adhesive and adhesively connects the fibres—this can be achieved during the drying, for example, of dispersions, or else by heating, further possibilities for variation existing by way of areal or partial application of pressure. The binder can be activated in known drying tunnels, or else, given a suitable selection of binder, by means of infrared radiation, UV radiation, ultrasound, high-frequency radiation or the like. For the subsequent end use it is sensible, although not absolutely necessary, for the binder to have lost its tack following the end of the nonwoven production process. It is advantageous that, as a result of the thermal treatment, volatile components such as fibre assistants are removed, giving a web having favourable fogging values so that when a low-fogging adhesive composition is used it is possible to produce an adhesive tape having particularly advantageous fogging values.

A further, special form of adhesive consolidation consists in activating the binder by incipient dissolution or swelling. In this case it is also possible in principle for the fibres themselves, or admixed special fibres, to take over the function of the binder. Since, however, such solvents are objectionable on environmental grounds, and/or problematic in their handling, for the majority of polymeric fibres, this process is not often employed. The same also applies to the Eisenhut process for consolidating viscose with aqueous sodium hydroxide solution. In contrast, the partial dissolution of polyvinyl alcohol binders with water has advantages, especially in the production of consolidated wet-laid webs.

FIG. 1 shows on the left-hand side a web 1 whose fibres 2 have been mechanically consolidated by means of water jets or needling. The right-hand side shows a web 1 which has received an additional adhesive consolidation. At the contact points between the individual fibres 3, the binder 4 has formed permanent connections which are retained even under normal tensile or compressive stresses. These connections can, as shown in FIG. 1, form a node, but may also extend over a considerable length of the fibre in the form of a "sail".

By means of the nature, proportion and distribution of the binder in the fibre web it is possible to influence not only the delamination resistance and binding of the individual fibres into the web assembly but also the properties such as flexural rigidity, textile hand, strength, damping character and surface texture, to name but a few.

Further treatments, such as impregnation, dyeing, calendering, coating and the production of composite materials with other backings (sheets, spunbonded webs, scrims, wovens or the like), round off the possibilities for use. By means in particular of controlled calendering with embossed rolls, it is possible to give the web a structure which not only makes it possible to establish specific surface textures but may also significantly enhance the manual tearability.

In one preferred embodiment the web has the following properties:

- a web weight of from 50 to 500 $g/m^2$, in particular from 80 to 200 $g/m^2$,
- a web thickness of from 100 to 3000 $\mu m$, in particular from 200 to 1000 $\mu m$,
- a breaking strength of from 75 to 500 N/(5 cm), in particular from 125 to 250 N/(5 cm) and/or
- a breaking extension of from 5 to 100%, in particular from 15 to 70%.

In order to give the adhesive tape of the invention properties optimized to the particular intended application, further additives can be added to the web backing during the production operation. Commercially customary UV stabilizers enhance the stability of the adhesive tape in the face of intense UV exposure to, for example, the sun. Particularly noteworthy in the case where the adhesive tape is used to bandage cable harnesses is the property whereby the web backing is flameproofed by the addition of flame retardants, preferably, ammonium polyphosphate and/or the selection of suitable fibres of low or zero flammability. With particular advantage it is possible to introduce, for example, solid flame retardants into binder dispersions, with the binder providing not only for adhesive fibre bonding but also binding the flame retardant permanently in the web.

Through the targeted use of coloured fibre material it is possible to manufacture a large number of different-coloured webs.

With further preference, the web backing is coated on one side with a self-adhesive composition which may in particular consist of a commercially customary pressure-sensitive adhesive composition based on acrylate or on rubber.

An adhesive composition which has proven to be particularly advantageous is one based on an acrylate hot-melt having a K value of at least 20, in particular more than 30, obtainable by concentrating a solution of such a composition to give a system which can be processed in hot-melt form.

The concentration can take place in appropriately equipped vessels or extruders; in the case of the associated devolatilization, a devolatilizing extruder is particularly preferred.

An adhesive composition of this type is specified in German Patent Application DE 43 13 008 A1. In an intermediate step, the solvent is removed completely from the acrylate compositions produced in this way.

In addition, further highly volatile constituents are removed in the course of this process. After coating from the melt, these compositions still contain small fractions of volatile constituents. It is therefore possible to use any of the monomers/recipes claimed in the abovementioned patent. A further advantage of the compositions described in the patent is that they have a high K value and hence a high molecular weight. The person skilled in the art is aware that systems having relatively high molecular weights can be crosslinked more efficiently. Therefore, the fraction of volatile constituents falls correspondingly.

The solution of the composition can contain from 5 to 80% by weight, in particular from 30 to 70% by weight, of solvents.

It is preferred to use commercially customary solvents, especially low-boiling hydrocarbons, ketones, alcohols and/or esters.

With further preference, single-screw, twin-screw or multiscrew extruders having one or, in particular, two or more devolatilizing units are employed.

In the adhesive composition based on acrylate hot-melt it is possible to incorporate benzoin derivatives by polymerization, examples being benzoin acrylate or benzoin methacrylate, or acrylic or methacrylic esters. Benzoin derivatives of this kind are described in EP 0 578 151 A1.

Alternatively, the acrylate hot-melt based adhesive composition can be crosslinked chemically.

In one particularly preferred embodiment the self-adhesive compositions employed are copolymers of (meth) acrylic acid and esters thereof with from 1 to 25 carbon atoms, maleic, fumaric and/or itaconic acid and/or esters thereof, substituted (meth)acrylamides, maleic anhydride and other vinyl compounds, such as vinyl esters, especially vinyl acetate, vinyl alcohols and/or vinyl ethers.

The residual solvent content should be below 1% by weight.

The coating of the adhesive side of the backing, in particular with a self-adhesive coating, takes place in a conventional manner. The coating is advantageously conducted conventionally with coater bars and solvent compositions, but even better in a contactless or virtually contactless manner by means of screen printing technology (compare DE 33 46 100 C2), in which case it is possible to conceive of a coating of adhesive over the full area or else in the manner of segments. For the most favourable parameters, express reference is made to the aformentioned patent DE 33 46 100 C2, especially in relation to the viscosity and the nature of the adhesive, and to the screens used, sheet speeds and other measures.

Alternatively, it is possible to employ transfer coating, preferably by means of a rolling-rod die applicator, in particular for a very wide variety of hot-melt adhesives. This technology enables a substrate to be coated with a very small amount of adhesive composition. This may be advantageous, since the adhesive composition which otherwise sinks in the backing not only constitutes a waste of material but even has an adverse effect on the damping properties of the adhesive tape in the course of use.

If coating on only one side is intended, this is done in particular, in the case of a stitched web, on the rougher, fibrous side, since this promotes the anchoring of the adhesive composition to the web and at the same facilates unwinding from a spiral roll.

Depending on the target applications, the adhesive coating may be accompanied by an anti-adhesive treatment to the reverse of the web backing. This additional coating of the second backing side can be undertaken with film-forming polymers, especially with acrylate varnish, or can be a combination of foam or paste and varnish. In the case of specific applications such as, for example, in the bandaging of cable harnesses, the coating of the reverse of the adhesive tape may be omitted entirely.

The use, in accordance with the invention, of the binder in the production of the web results in a marked consolidation of the material in the "z direction" without adversely affecting the damping effect of the adhesive tape produced therewith.

After the adhesive consolidation of the web, contact points between the individual fibres in the assembly are firmly joined to one another by melting, so that the web does not split when the tape is unwound from the roll. Since the individual fibres as well are attached to the surface in this way, fibre tear-out occurs only to a greatly restricted extent, if at all.

The adhesive tape of the invention exhibits an outstanding damping quality. This can be attributed to the particular structure of the web of the invention: a high proportion of air, included in the three-dimensional network, is able to provide very good cushioning against external vibrations. A bandage comprising the adhesive tape of the invention therefore exhibits high flexibility within the individual wraps, which likewise has a positive effect on the damping properties.

The production of the adhesive tape of the invention is described below in an exemplary embodiment without thereby wishing to restrict the invention in any way whatsoever.

EXAMPLE 1

Fine binder powder is distributed uniformly by means, for example, of sieving or by means of an electrostatic spray gun, into a fibre web of the "Malifleece" type, consisting of polyester fibres having a linear density of 3.3 dtex and a fibre length of from 60 to 80 mm, and with a basis weight of 150 g/m$^2$. When the self-crosslinking binder powder VINNEX® LL 2321, a styrene-acrylate copolymer, is used in an amount of the order of 5% by weight, with subsequent thermal activation at about 160° C., the preconsolidated web acquires the necessary additional composite strength. Although there is an increase in the stiffness of the backing, this is acceptable for the application and in the case of specific requirements can be compensated by softer binder powders. The consolidated web is coated by the bar coater method with a suitable natural rubber-resin self-adhesive composition, dried gently at 60° C. and wound to give an adhesive tape roll. The roll can be unwound without the backing splitting.

EXAMPLE 2

A staple fibre web comprising 100% viscose fibres and having a basis weight of 120 g/m$^2$ is preconsolidated in a customary production-line water-jet consolidation unit. The deficient bonding of the fibres at the surface is improved by spraying the said surface on one side with a suitable, fine acrylate dispersion (application of about 5 to 10 g/m$^2$). Drying produces a backing material which, after being coated with a self-adhesive composition in accordance with Example 1, is likewise suitable for the production of adhesive tape rolls. Depending on the chosen process parameters (solids content and viscosity of the binder dispersion, spraying geometry, dwell time between spraying and drying) a fairly superficial coating with a filmlike but not closed structure, or else a marked penetration of the binder into the fibre assembly, is obtained, the textile nature of the backing being retained to a greater extent in this case.

In addition to the reduction in fibre tear-out when the adhesive tape is unwound, a broad improvement in the manual tearability is also observed.

What is claimed is:

1. Adhesive tape comprising a tapelike backing of nonwoven material, which is coated on at least one side with an adhesive, the nonwoven material being a web consisting of a staple fibre web which is mechanically consolidated or wet-laid, the staple fibre web being consolidated further by the addition of binders which bind the web predominantly at fibre nodal points.

2. Adhesive tape according to claim 1, wherein powders are used as binders and the binders are optionally present in solution in water or organic solvents or as a dispersion.

3. Adhesive tape according to claim 2, wherein the binders are present as a binder dispersion.

4. Adhesive tape according to claim 1, wherein from 3% to 50%, based on the weight of the fibre web, of the binders are added.

5. Adhesive tape according to claim 1, wherein the web has the following properties:
   a web weight of from 50 to 500 g/m$^2$,
   a web thickness of from 100 to 3000 µm,
   a breaking strength of from 75 to 500 N/(5 cm), or a breaking extension of from 5 to 100% or both.

6. Adhesive tape according to claim 1, wherein the web is coated on one side with self-adhesive composition.

7. Adhesive tape according to claim 1, wherein the adhesive coating consists of a pressure-sensitive adhesive composition based on acrylate or on rubber.

8. Adhesive tape according to claim 1, wherein the reverse of the web has been anti-adhesively treated.

9. Adhesive tape according to claim 1, wherein one or more additives selected from the group consisting of pigments and UV stabilizers have been added to the web.

10. Adhesive tape according to claim 1, wherein the adhesive tape is flameproof by the addition of ammonium polyphosphate.

11. A method for bandaging cable harnesses, which comprises bandaging said harnesses with an adhesive tape according to claim 1.

* * * * *

UNITED STATES PATENT AND TRADEMARK OFFICE
CERTIFICATE OF CORRECTION

PATENT NO.     : 6,436,528 B1
DATED          : August 20, 2002
INVENTOR(S)    : Klaus Kulper and Frank Ganschow It is certified that error appears in the above-identified patent and that said Letters Patent is hereby corrected as shown below:

<u>Title page,</u>
Item [56], References Cited, first entry, "5,496,603 delete 3/1996" change to
-- 5/1996 --

Signed and Sealed this

Twenty-eighth Day of January, 2003

JAMES E. ROGAN
*Director of the United States Patent and Trademark Office*